Feb. 21, 1967　　H. P. FOCHLER　　3,304,580
APPARATUS PRODUCING PIPE
Filed March 14, 1963

INVENTOR.
HELMUT P. FOCHLER
BY
Teare, Fetzer & Teare
ATTORNEYS

United States Patent Office 3,304,580
Patented Feb. 21, 1967

3,304,580
APPARATUS PRODUCING PIPE
Helmut P. Fochler, Bedford, Ohio, assignor, by mesne assignments, to Continental Oil Company, a corporation of Delaware
Filed Mar. 14, 1963, Ser. No. 265,247
3 Claims. (Cl. 18—14)

This invention relates in general to an apparatus for the production of tubing or pipe, and more particularly to the extrusion of plastic tubing or pipe.

The apparatus conventionally used for extruding thermoplastic or thermosetting material into tube or pipe form generally embodies a rotatable screw feed disposed in a stationary housing, which screw moves the plastic stock material in heated form up to a die, through which the material is extruded into the desired configuration, and usually onto a coacting mandrel arrangement. Standard practice in the production of plastic tubing or pipe has heretofore generally involved the compression of the heated plastic material being fed to the die, by the use of a compression type of feed screw, which operates to compress the material from the point of entrance of the material to the screw, to the discharge end of the screw, and progressively as the stock material is passed or moved along the screw during rotation of the latter. This compression of the stock has been accomplished by utilizing a screw having a progressively decreasing flight depth in a direction toward the discharge end of the screw. Also, heretofore, conventional practice has sometimes involved utilization of what may be termed a multi-stage compression screw, wherein the flight depth of the screw diminishes in a direction toward the discharge end thereof but to an intermediate point on the feed screw, and then the flight depth suddenly increases and then is reduced generally gradually again as the discharge end of the screw is approached.

The present invention utilizes a generally "no compression" feed screw, wherein the flight depth of the screw is uniform from the stock material entrance end of the screw to the discharge end of the screw, thereby resulting in no material compression of the plastic stock being progressively transferred, by the material and screw itself. A certain relationship between the flight depth and the outside diameter, and the length of the screw, has been found to be capable at conventional speeds, of greatly increasing the effective output of plastic material in the production of tubing, pipe and the like, and yet a plastic material which has generally improved or more uniform physical characteristics as compared to that produced at a slower production rate.

Accordingly, an object of the invention is to provide an improved extrusion apparatus for the production of plastic tubing, pipe, and the like.

Another object of the invention is to provide an extrusion apparatus for the production of plastic tubing, pipe and the like wherein the rotatable screw of the extruding apparatus has a substantially uniform flight depth throughout its extent, resulting in a generally "no-compression" feed of the plastic material, due to the material and the screw.

A still further object of the invention is to provide a novel extrusion apparatus for use in extruding plastic tubing, pipe and the like, wherein the screw is of uniform flight depth throughout its length, resulting in a "no-compression" feed due to the material and the screw itself, up to the extrusion die, and wherein the ratio of the outside diameter of the screw to the flight depth of the screw is approximately 10 to 1, and the ratio of the flight length of the screw to said outside diameter of the screw is approximately 24 to 1.

Other objects and advantages of the invention will be apparent from the following description taken in conjunction with the accompanying drawings wherein.

Figure 1:
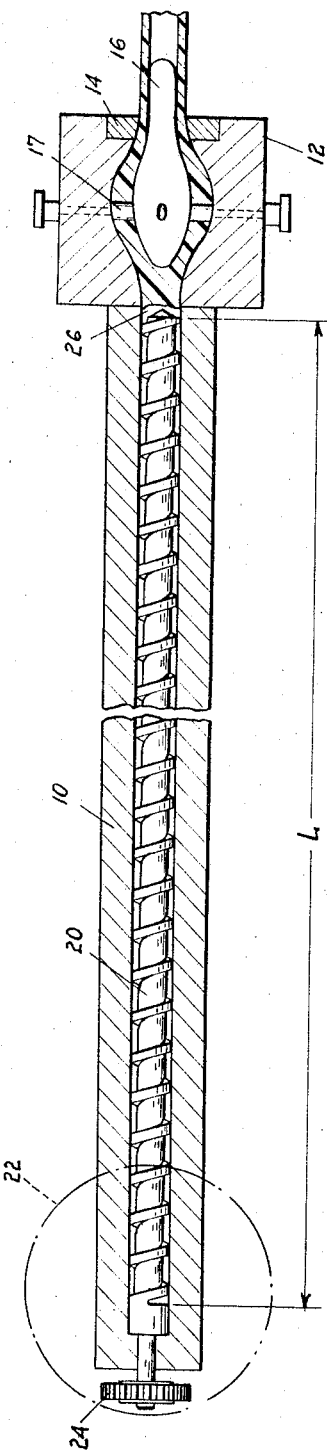
FIG. 1 is a top plan, sectioned, generally diagrammatic view of an extruding machine which is used for heating and extruding the plastic material, and one embodying the instant invention.

Referring now again to the drawings there is illustrated a plastic extruding apparatus comprising a barrel or housing 10 having a head 12 with a die 14, which is adapted for coaction with a mandrel 16, for forming plastic tubing, pipe, or the like. Mandrel 16 may be held in position by spider 17, and may be water cooled.

Disposed in barrel 10 is a rotatable, material transferring screw member 20, for taking the plastic stock material fed into, for instance, the hopper 22 adjacent one end of the screw, and transferring it to the head 12. Means 24 may be provided in coupled relation with the screw, for connection to a source of power, such as a motor, for rotating the screw and in any suitable manner. Means (not shown) may also be provided in the conventional manner for selectively controlling the speed of rotation of the screw.

The plastic stock material which, for instance, may be of a vinyl type, such as polyvinyl chloride (PVC) in powdered or granule form, may be inserted into the hopper 22, and the rotating screw 20 transfers it to the head 12 where it is extruded out the die 14 onto the mandrel 16 which forms a support for the produced tubing or pipe. Housing 10 may have suitable heating elements embodied therein, for adequately heating the plastic material to provide the latter with a suitable viscosity for extruding purposes.

When utilizing the aforementioned polyvinyl chloride stock for the plastic material, the desired temperature relationship of the barrel 10 is about 360° F. at the inlet or hopper end of the barrel, and a temperature of about 400° F. at the discharge end 26 of the barrel. This may result in a plastic extrusion temperature of approximately 400° F. for the plastic stock material which is considerably higher than conventional heretofore utilized temperatures for pipe, the latter for the stock material extrusion temperature being generally around 350° F. for PVC pipe.

Figure 2:
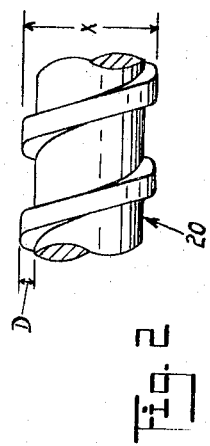
FIG. 2 is a fragmentary, enlarged view of the material transferring screw of the apparatus of FIG. 1, and showing in greater detail the relationship between the outside diameter of the screw and the flight depth of the screw.

In accordance with the instant invention, the screw feed of the stock plastic material up to the head 12 is of a generally "non-compression" type of feed, and to this end, the screw is of a substantially uniform flight depth D (FIG. 2) for its full length. Such uniform flight depth of the screw feed up to the head 12 and with the resultant non-compression of the hot, plastic stock material as it is passed to the head by the screw, results not only in an increased production rate of extruded stock but also an extruded material having more uniform physical characteristics as compared to a "compression" type of screw feed wherein the material is compressed by the screw and the material being transferred, as it is fed through the barrel. Moreover, the plastic material is exposed to much less frictional action due to the generally "non-compression" of the stock material, and therefore the latter's stability, such as for instance its heat and light stability, are less effected by the instant arrangement of apparatus and method.

Now it has been determined that there are certain highly desirable if not necessary relationships between the flight depth D and the outside diameter X (FIG. 2) of the screw, and the flight length L of the screw, in order to obtain an increased production output when the screw is rotated at a predetermined speed, while still obtaining adequate mixing and anti-surging of the stock material. Such relationships have been found to be as follows: The desired ratio between the outside diameter X (FIG. 2) of the feed screw and the flight depth D has been found to be approximately 10 to 1 while the ratio of the flight length L of the screw with respect to the outside diameter X of the screw, has been found to be approximately 24 to 1. With such relationships of dimensions of the flight depth of the screw with respect to the flight length and the outside diameter of the screw, the output of an extruder producing 1½ inch I.D. PVC pipe has been found to be materially increased at a predetermined screw speed, say for instance 35 r.p.m., and from an output of 70 to 80 pounds of extruded plastic material per hour utilizing a conventional multi-stage compression type screw, to an output of approximately 110 pounds per hour using the "non-compression" screw of the invention, with the same size of barrel and die, the outside diameter of the screw in this case being 2.500 inches. The physical characteristics and quality of the extruded plastic material or plastic tubing produced by the instant arrangement have been found to be at least as good as the quality of the tubing or pipe produced by either a single stage, compression type of extrusion screw, or a multi-stage, compression type of extrusion screw, and the uniformity of such physical characteristics and quality is much greater in a run of tubing produced in accordance with the instant invention. In this connection, the weldability of the plastic stock after it passes spider 17, the burst strength, impact strength, resistance to creep and flexural strength are at least as good as, and more often better and more uniform throughout a run of the tubing, as compared to that produced with a compression type screw.

The extruding head 12 and associated die 14 create a certain back pressure in the plastic material being extruded into tubular form and this back pressure will generally vary with the ratio between the length of the head zone leading to the die 14 and the wall thickness of the tubing which is being extruded. For example, a ratio of 4½ to 1 has been utilized to produce the 1½ inch I.D. tubing aforementioned.

From the foregoing discussion and accompanying drawings it will be seen that there is provided a novel apparatus utilizing a generally "no-compression" feed screw construction, for extruding plastic materials into tubular or pipe form, and a feed screw having a particular relationship between the depth of the screw flight, the length of the screw flight, and the outside diameter of the latter. The invention also provides a novel method of producing plastic tubing wherein a run of such tubing has more uniformity of physical characteristics, together with a greater output of the tubing as compared to heretofore utilized compression type extruding apparatuses.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:
1. In an extruding apparatus for producing a polymeric tubing product comprising, an elongated barrel having a passageway extending axially therethrough, said barrel having an inlet means adjacent one end communicating with said passageway and an outlet means adjacent the other end communicating axially with said passageway, die head attached to the other end of said barrel, said die head having a die cavity communicating with said outlet means, a rotatable screw having a substantially uniform flight depth throughout its length disposed within the passageway of said barrel and extending axially from said inlet means into close proximity adjacent said outlet, means for progressively transferring polymeric material in a substantially compression free condition through said passageway, the ratio of the outside diameter of the screw flight to the flight depth being approximately 10:1, and the ratio of the flight length to the outside diameter of the screw flight being approximately 24:1.

2. In an apparatus in accordance with claim 1, wherein the axial length of said die cavity from the end adjacent said outlet means to said die member is approximately four times greater than the wall thickness of the final extruded tubing product.

3. In an apparatus in accordance with claim 1, including a mandrel disposed symmetrically within and extending axially of said die cavity, said mandrel having a greater maximum transverse dimension as compared to the maximum transverse dimension of the passageway in said barrel, and having a lesser maximum transverse dimension as compared to the maximum transverse dimension of said die cavity.

References Cited by the Examiner

UNITED STATES PATENTS

| 2,501,690 | 3/1950 | Prendergast | 264—209 X |
| 2,666,947 | 1/1954 | Shaw | 264—209 |
| 2,702,408 | 2/1955 | Hartland | 18—12 |
| 2,946,089 | 7/1960 | Heston | 18—12 |

FOREIGN PATENTS 658,102   3/1938   Germany.

ROBERT F. WHITE, *Primary Examiner.*

ALEXANDER H. BRODMERKEL, *Examiner.*

A. R. NOE, *Assistant Examiner.*